United States Patent
Yukitake

(10) Patent No.: US 7,385,366 B2
(45) Date of Patent: Jun. 10, 2008

(54) METHOD FOR CONTROLLING HYDRAULIC BRUSHLESS MOTOR AND CONTROLLING DEVICE

(75) Inventor: Yasuhiro Yukitake, Ikoma-gun (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/522,942

(22) Filed: Sep. 19, 2006

(65) Prior Publication Data
US 2007/0075662 A1    Apr. 5, 2007

(30) Foreign Application Priority Data
Sep. 30, 2005    (JP) .............................. 2005-286264

(51) Int. Cl.
*H02P 6/00* (2006.01)
(52) U.S. Cl. .................. 318/400.14; 318/471
(58) Field of Classification Search ................ 318/700, 318/400.01, 400.14, 437, 471; 388/934
See application file for complete search history.

(56) References Cited

U.S. PATENT DOCUMENTS

| | | | | |
|---|---|---|---|---|
| 5,298,839 A | * | 3/1994 | Takeda | 318/254 |
| 6,002,234 A | * | 12/1999 | Ohm et al. | 318/729 |
| 6,259,226 B1 | * | 7/2001 | Kaitani et al. | 318/798 |
| 2004/0245949 A1 | * | 12/2004 | Ueda et al. | 318/254 |
| 2006/0012324 A1 | * | 1/2006 | Eskritt et al. | 318/437 |

FOREIGN PATENT DOCUMENTS

JP    5-103454    4/1993

* cited by examiner

*Primary Examiner*—Bentsu Ro
(74) *Attorney, Agent, or Firm*—Oblon, Spivak, McClelland, Maier & Neustadt, P.C.

(57) ABSTRACT

The method for controlling the hydraulic brushless motor operates the hydraulic brushless motor by switching the conduction timing to a plurality of switching elements. The method for controlling the hydraulic brushless motor includes detecting the oil temperature and advancing the conduction start timing when the oil temperature is lower than or equal to a predetermined value.

3 Claims, 5 Drawing Sheets

METHOD FOR CONTROLLING HYDRAULIC BRUSHLESS MOTOR AND CONTROLLING DEVICE

BACKGROUND OF THE INVENTION

The present invention relates to methods for controlling a hydraulic brushless motor and controlling devices, and more specifically, relates to a method and a device for controlling the brushless motor mounted on an automobile and used in hydraulic pumps and the like.

A DC motor with brush is conventionally used as an electrically operated motor for driving the hydraulic pump for transmission or power steering mounted on the automobile, but problem regarding reliability due to durability of the brush arises. The brushless motor is thus desirably used.

The controlling device of the brushless motor is configured by a motor with magnetic coils of three phases, the U phase, the V phase and the W phase; and a switching circuit including six switching elements for driving the motor.

The operation of the brushless motor is performed by sequentially switching the switching element for conduction to the magnetic coils of three phases. For example, if the conduction angle is 60 degrees, the conduction signal of each switching element is continuously turned ON only over 120 degrees out of the electrical angle of 360 degrees, whereby the conduction of 120 degrees is performed in each switching element. Two out of six switching elements are simultaneously turned ON, where one of the two switching elements that are turned ON is turned OFF and one of the other four switching elements is turned ON every 60 degrees. This operation is subsequently repeated. The method for controlling the motor for operating the motor by sequentially switching each switching element in the above manner is known. In the motor of the in-vehicle hydraulic pump, high torque low rotation is required when the oil temperature is low, and low torque high rotation is required when the oil temperature is high.

Since the usage voltage is relatively low and restrictions such as current consumption and size are extremely severe for the in-vehicle motor, the required output is particularly difficult to obtain on the high torque side, and the required output points for both the high oil temperature and the low oil temperature cannot be satisfied without enlarging the motor when the method for controlling the motor by 60 degrees conduction as disclosed in patent article 1 is applied (see patent article 1=Japanese Laid-Open Patent Publication No. 05-103454)

SUMMARY OF THE INVENTION

The present invention aims to provide a method for controlling a hydraulic brushless motor and a controlling device that satisfies the required output points for both the required output point in low torque high rotation where the oil temperature is high, and the required output point in high torque low rotation where the oil temperature is low.

The method for controlling a hydraulic brushless motor according to the first invention relates to a method for controlling a brushless motor for operating a hydraulic brushless motor by switching a conduction timing to a plurality of switching elements; the method comprising the steps of detecting an oil temperature; and advancing the conduction start timing when the oil temperature is lower than or equal to a predetermined value.

The hydraulic brushless motor is used in a pump for supplying hydraulic oil to the transmission and the like. The hydraulic pump for transmission must correspond to a wide range of temperature from low temperature to high temperature and is suitable for applying the present invention. The present invention may be applied to various pumps other than the hydraulic pump for transmission.

The switching element includes a transistor and a diode.

The step of advancing the conduction start timing includes advancing the conduction start timing by 0 to 30 degrees, for example, 15 degrees. However, the timing of cutting the conduction is not changed.

According to the method for controlling the hydraulic brushless motor of the first invention, the conduction start timing is advanced when the oil temperature is lower than or equal to a predetermined value with the conduction start timing (standard conduction start timing) of when the oil temperature is higher than the predetermined value as the reference, so that high torque is obtained compared to that in the standard conduction start timing. Since the rotation speed becomes low on the low torque side compared to the standard conduction start timing if the conduction start timing is maintained advanced when the oil temperature is higher than the predetermined value, the timing must be returned to the standard conduction start timing when the oil temperature becomes higher than the predetermined value. Therefore, compared to the controlling method in which the standard conduction start timing is constantly used, the same output is obtained when the oil temperature is higher than the predetermined value, and high output is obtained when the oil temperature is lower than or equal to the predetermined value.

A method for controlling the hydraulic brushless motor according to a second invention relates to a method for controlling a brushless motor for operating the hydraulic brushless motor by switching a conduction timing to a plurality of switching elements; the method comprising the steps of detecting a current of the motor; and advancing the conduction start timing when the current of the motor is greater than or equal to a predetermined value.

The change in the conduction start timing may depend on the torque value, and may be switched when the current of the motor corresponding to the torque reaches a predetermined value.

Therefore, if the current detecting means of the motor is arranged but the oil temperature detecting means of the hydraulic pump hydraulic oil is not arranged, the same effects as the first invention are obtained without separately arranging the oil temperature detecting means by using the current of the motor in place of the oil temperature.

According to the method for controlling the hydraulic brushless motor of the second invention, the conduction start timing is advanced when the current of the motor is greater than or equal to a predetermined value with the conduction start timing (standard conduction start timing) of when the current of the motor is less than the predetermined value as the reference, so that high torque is obtained compared to that in the standard conduction start timing. Since the rotation speed becomes low on the low torque side compared to the standard conduction start timing if the conduction start timing is maintained advanced when the current of the motor is less than the predetermined value, the timing must be returned to the standard conduction start timing when the current of the motor becomes less than the predetermined value. Therefore, compared to the controlling method in which the standard conduction start timing is constantly used, the same output is obtained when the current of the motor is less than the predetermined value, and high output is obtained when the current of the motor is greater than or equal to the predetermined value.

A controlling device of the hydraulic brushless motor according to a first invention relates to a controlling device a brushless motor for operating the hydraulic brushless motor by switching a conduction timing to a plurality of switching elements; the device comprising an oil temperature detecting means for detecting the oil temperature; and a conduction start timing setting means for advancing the conduction start timing when the oil temperature of the motor is lower than or equal to a predetermined value.

According to the controlling device of the hydraulic brushless motor according to the first invention, the conduction start timing is advanced when the oil temperature is lower than or equal to a predetermined value with the conduction start timing (standard conduction start timing) of when the oil temperature is higher than the predetermined value as the reference, so that high torque is obtained compared to that in the standard conduction start timing. Since the rotation speed becomes low on the low torque side compared to the standard conduction start timing if the conduction start timing is maintained advanced when the oil temperature is higher than the predetermined value, the timing must be returned to the standard conduction start timing when the oil temperature becomes higher than the predetermined value. Therefore, compared to the controlling method in which the standard conduction start timing is constantly used, the same output is obtained when the oil temperature is higher than the predetermined value, and high output is obtained when the oil temperature is lower than or equal to the predetermined value.

A controlling device of a hydraulic brushless motor according to a second invention relates to a controlling device a brushless motor for operating the hydraulic brushless motor by switching a conduction timing to a plurality of switching elements; the device comprising a motor current detecting means for detecting the current of the motor; and a conduction start timing setting means for advancing the conduction start timing when the current of the motor is greater than or equal to a predetermined value.

According to the controlling device of the hydraulic brushless motor of the second invention, the conduction start timing is advanced when the current of the motor is greater than or equal to a predetermined value with the conduction start timing (standard conduction start timing) of when the current of the motor is less than the predetermined value as the reference, so that high torque is obtained compared to that in the standard conduction start timing. Since the rotation speed becomes low on the low torque side compared to the standard conduction start timing if the conduction start timing is maintained advanced when the current of the motor is less than the predetermined value, the timing must be returned to the standard conduction start timing when the current of the motor becomes less than the predetermined value. Therefore, compared to the controlling method in which the standard conduction start timing is constantly used, the same output is obtained when the current of the motor is less than the predetermined value, and high output is obtained when the current of the motor is greater than or equal to the predetermined value.

DETAILED DESCRIPTION OF THE PREFERRED EMBODIMENTS

The embodiment applying the present invention to the control of in-vehicle brushless DC motor will now be described with reference to the accompanied drawings.

Figure 1:
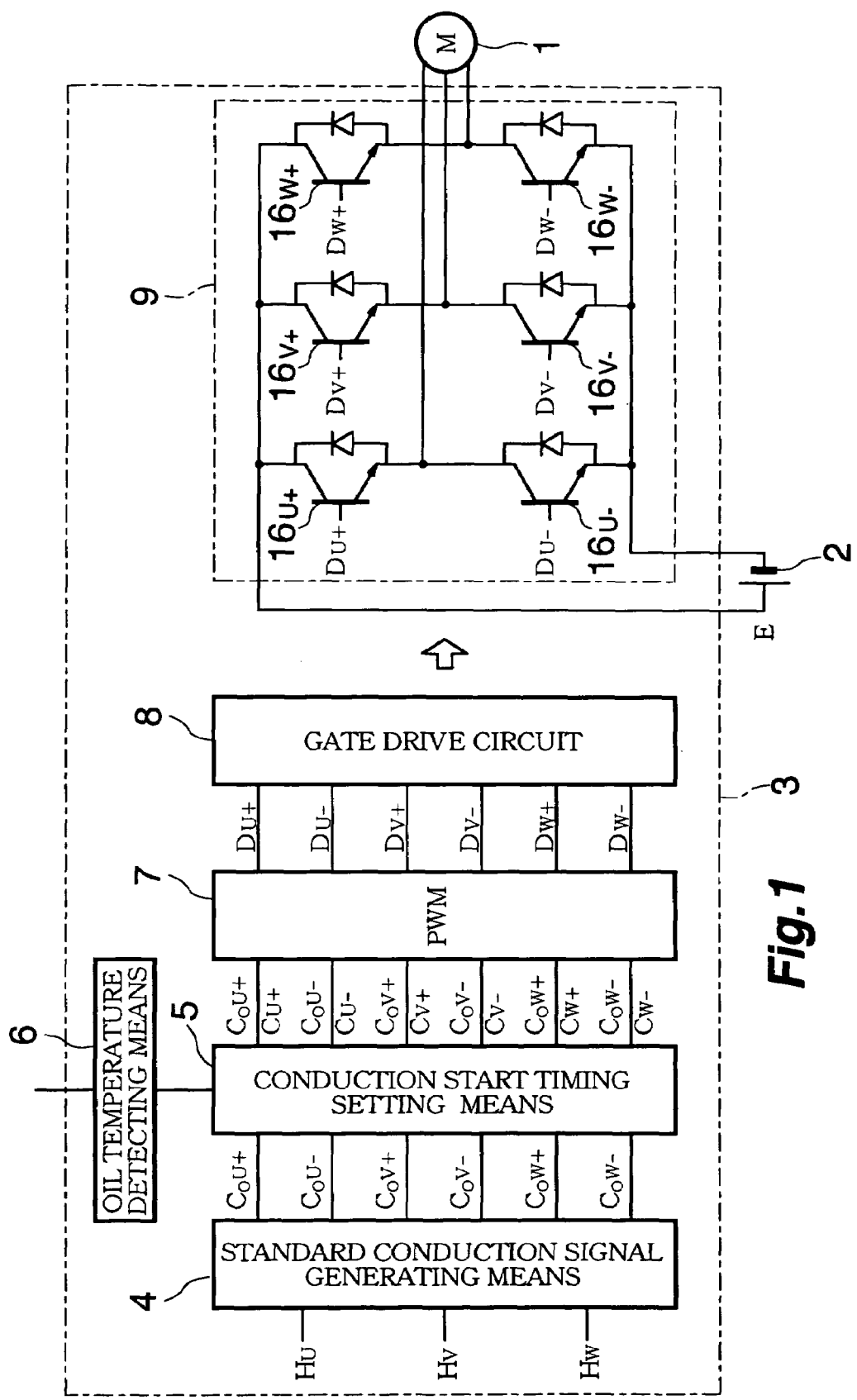
FIG. 1 is a block diagram of a controlling device of a hydraulic brushless motor showing an embodiment of the present invention.

FIG. 1 shows one example of a configuration of a controlling device of the brushless DC motor (1).

The controlling device drives the brushless DC motor (1), that is mounted on an automobile to drive the hydraulic pump, in a one-side PWM method by means of a direct current power source (2) including a battery mounted on the automobile; and includes a conduction controlling device (3) serving as a conduction controlling means for controlling the conduction to the three phases of U phase, V phase and W phase from the power source (2) in the one-side PWM method based on rotating position signals $H_U$, $H_V$, $H_W$. The rotating position signals are $H_U$, $H_V$, $H_W$ and collectively designated as H.

The one-side PWM method is a method in which only one switching element of either the upper arm or the lower arm of each phase ($16_U+$) ($16_V+$) ($16_W+$) is PWM driven during the conduction interval, and the other switching elements ($16_U-$) ($16_V-$) ($16_W-$) is fixed to ON during the conduction interval. For example, the switching element of the upper arm during the conduction interval is fixed to ON and the switching element of the lower arm during the conduction period is ON/OFF driven based on the PWM driving signal. Alternatively, the switching element of the lower arm during the conduction interval is fixed to ON and the switching element of the upper arm during the conduction period is ON/OFF driven based on the PWM driving signal.

The conduction controlling device (3) is configured by a standard conduction signal generating means (4), a conduction start timing setting means (5), an oil temperature detecting means (6), a PWM means (7), a gate drive circuit (8), and a switching circuit (9).

The standard conduction signal generating means (4) generates a standard conduction signal for controlling the respective conduction of each element (16) based on the rotating position signal H as hereinafter described. The standard conduction signal is collectively designated as $C_0$. The standard conduction signal generating means (4) may be configured by an MPU or may be configured by a dedicated digital circuit.

The conduction start timing setting means (5) outputs the standard conduction signal $C_0$ in which the conduction start timing is normal, or the low oil temperature conduction signals $C_U+$, $C_U-$, $C_V+$, $C_V-$, $C_W+$, $C_W-$ in which the conduction start timing is ahead of the standard conduction signal $C_o$ depending on whether the oil temperature is lower than or equal to a predetermined value or higher than the predetermined value. The low oil temperature conduction signal is collectively designated as C.

The oil temperature detecting means (6) detects the oil temperature of the transmission and outputs the data signal of the temperature of the oil to the conduction start timing setting means (5).

The PWM means (7) outputs the switching element control signals $D_U+$, $D_U-$, $D_V+$, $D_V-$, $D_W+$, $D_W-$ for each element based on the standard conduction signal $C_0$ and the low oil temperature conduction signal C from the conduction start timing setting means (5). The switching element control signal is collectively designated D.

The gate drive circuit (8) ON/OFF drives each element based on the switching element control signal D.

The switching circuit (9) includes an upper arm switching element ($16_U+$) and a lower arm switching element ($16_U-$) for controlling the conduction to the U phase, an upper arm switching element ($16_V+$) and a lower arm switching element ($16_V-$) for controlling the conduction to the V phase, and an upper arm switching element ($16_W+$) and a lower arm switching element ($16_W-$) for controlling the conduction to the W phase of the motor (1) from the power supply (2). The switching elements are collectively designated by reference character (16). The switching element (16) includes a transistor and a diode, where the diode is connected with the emitter of the transistor as negative and the collector as positive, which are represented as ON and OFF, and are mutually operated to drive the motor (1).

Figure 2:
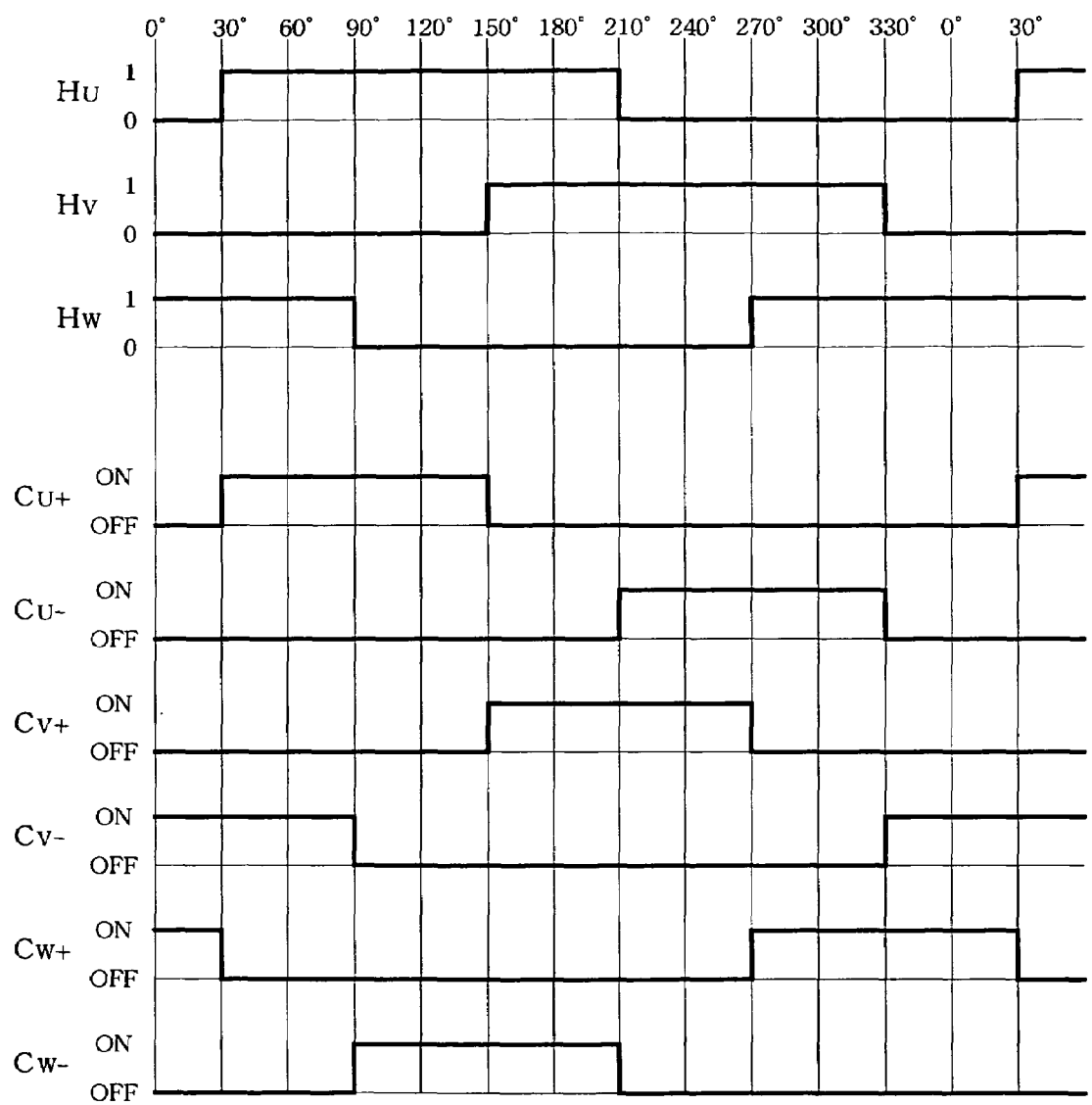
FIG. 2 is a time chart for standard conduction start timing.

As shown in FIG. 2, the rotating position signal H is expressed with 1 and 0, and the polarity thereof is inverted for every electrical angle of 180 degrees. The rotating position signal $H_V$ of the V phase is delayed by 120 degrees with respect to the rotating position signal $H_U$ of the U phase, and the rotating position signal $H_W$ of the W phase is further delayed by 120 degrees with respect to the rotating position signal $H_V$ of the V phase.

The standard conduction signal $C_0$ is continuously turned ON over a predetermined 120 degrees out of the electrical angle of 360 degrees, whereby a so-called 120 degrees conduction (conduction angle of the motor is 60 degrees) is performed.

The conduction signal $C_{0U}+$ of the upper arm of the U phase is turned ON over the electrical angle of 120 degrees from the rise of the rotating position signal $H_U$ of the U phase. The conduction signal $C_{0U}-$ of the lower arm of the U phase is turned ON over the electrical angle of 120 degrees from the fall of the rotating position signal $H_U$ of the U phase. The conduction signal $C_{0V}+$ of the upper arm of the V phase is turned ON over the electrical angle of 120 degrees from the rise of the rotating position signal $H_V$ of the V phase. The conduction signal $C_{0V}-$ of the lower arm of the V phase is turned ON over the electrical angle of 120 degrees from the fall of the rotating position signal $H_V$ of the V phase. The conduction signal $C_{0W}+$ of the upper arm of the W phase is turned ON over the electrical angle of 120 degrees from the rise of the rotating position signal $H_W$ of the W phase. The conduction signal $C_{0W}-$ of the lower arm of the W phase is turned ON over the electrical angle of 120 degrees from the fall of the rotating position signal $H_W$ of the W phase.

Figure 3:
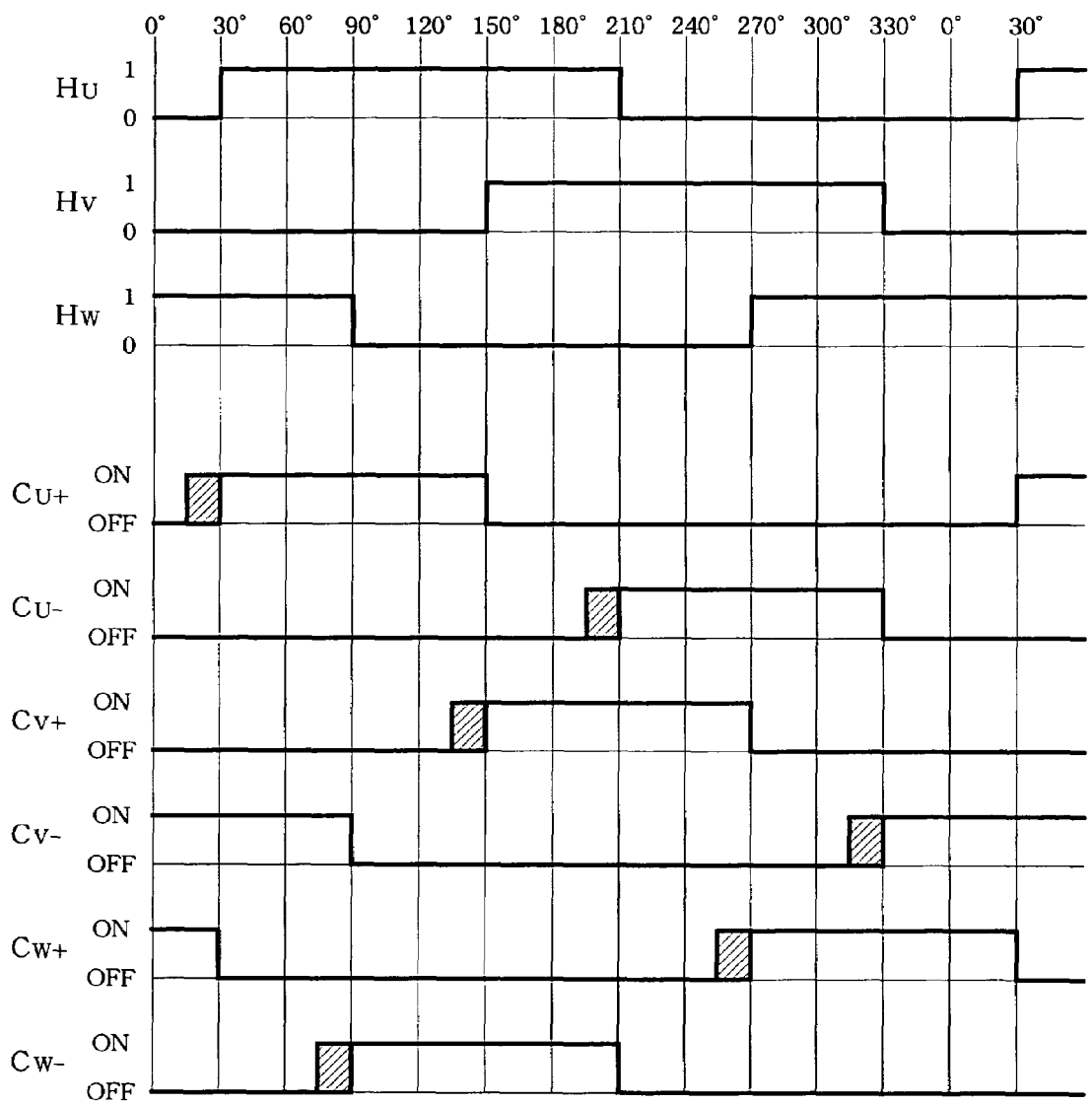
FIG. 3 is a time chart of when the conduction start timing of the signal of FIG. 2 is advanced by 15 degrees.

As shown in FIG. 3, the low oil temperature conduction signal C is generated by advancing the conduction signal timing of the standard conduction signal $C_0$ by 15 degrees.

The conduction signal $C_U+$ of the upper arm of the U phase is turned ON over the electrical angle of 135 degrees from 15 degrees ahead of the rise of the rotating position signal $H_U$ of the U phase. The conduction signal $C_U-$ of the lower arm of the U phase is turned ON over the electrical angle of 135 degrees from 15 degrees ahead of the fall of the rotating position signal $H_U$ of the U phase. The conduction signal $C_V+$ of the upper arm of the V phase is turned ON over the electrical angle of 135 degrees from 15 degrees ahead of the rise of the rotating position signal $H_V$ of the V phase. The conduction signal $C_V-$ of the lower arm of the V phase is turned ON over the electrical angle of 135 degrees from 15 degrees ahead of the fall of the rotating position signal $H_V$ of the V phase. The conduction signal $C_W+$ of the upper arm of the W phase is turned ON over the electrical angle of 135 degrees from 15 degrees ahead of the rise of the rotating position signal $H_W$ of the W phase. The conduction signal $C_W-$ of the lower arm of the W phase is turned ON over the electrical angle of 135 degrees from 15 degrees ahead of the fall of the rotating position signal $H_W$ of the W phase.

The one-side PWD drive is performed by driving the switching element (16) using the control signals such as the above.

As a result, the shaded portion in FIG. 3 is added to the standard conduction signal $C_0$, and thus is continuously turned ON over a predetermined 135 degrees out of the electrical angle of 360 degrees, whereby 135 degrees conduction is performed (conduction signal of the motor is 75 degrees).

With regards to the method for controlling the motor (1) according to the present invention, a case of when the standard conduction signal $C_0$ is input to each switching element (16) is shown with a solid line, at which standard conduction signal $C_0$ the output point of when the oil temperature is high is satisfied but the output point of when the oil temperature is low is not satisfied.

A case of when the standard conduction signal $C_0$ is advanced by 15 degrees is shown with slanted lines, at which low oil temperature conduction signal C shown with the slanted lines the output point of when the oil temperature is low is satisfied but the output point of when the oil temperature is high is not satisfied.

Figure 4:
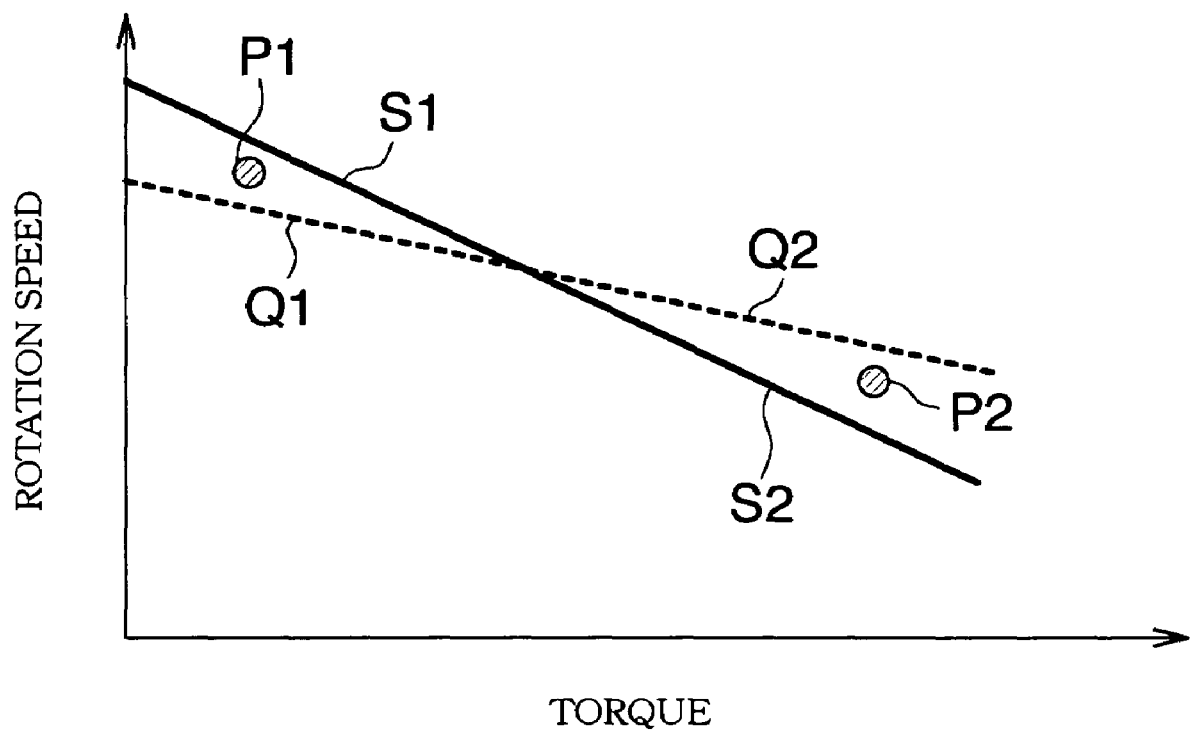
FIG. 4 is a view showing data representing the property of the motor according to the correlation between the rotation speed and the torque.

The graph of FIG. 4 shows the relationship between the rotation speed and the torque with the conduction start timing as the parameter. Description on how the motor (1) is controlled by the standard conduction signal $C_0$ and the low oil temperature conduction signal C output from the conduction timing setting means (5) will now be made with reference to the figure.

In FIG. 4, a case of when controlled by the standard conduction signal $C_0$ (conduction angle of the motor is 60 degrees) is shown with a solid line, and a case of when controlled by the low oil temperature conduction signal C (conduction angle of the motor is 75 degrees) is shown with a dotted line. The solid line of when controlled by the standard conduction signal $C_0$ and the dotted line of when controlled by the low oil temperature conduction signal C intersect, where the left side from the intersecting point is the low torque region, and the right side is the high torque region. The required output point of when the oil temperature is high is indicated by P1, and the required output point of when the oil temperature is low is indicated by P2. The single body property of the motor (1) is designed so that the property S1 in the low torque region satisfies the required output point P1 of when the oil temperature is high when controlled by the standard conduction signal $C_0$.

In the motor (1) with the single body property, the required output point P2 of when the oil temperature is low is not satisfied with the property S2 in the high torque region when controlled by the standard conduction signal $C_0$, similar to the conventional technology. Therefore, in the high torque region, control is made by the low oil temperature conduction signal C, and the property Q2 in the high torque region is used. The property Q2 in the high torque region during control by the low oil temperature conduction signal C achieves increase in torque of the output of the motor (1) by advancing the conduction start timing, whereby the required output point P2 of when the oil temperature is low is satisfied. Since increase in the conduction angle does not increase the entire output of the motor (1) but changes the slope of the equation of the torque-rotation speed, the property Q1 in the low torque region during control by the low oil temperature conduction signal C cannot satisfy the required output point P1 of when the oil temperature is high. In order to avoid this, switch is made to the control by the standard conduction signal $C_0$ so that the property Si in the low torque region during control by the standard conduction signal $C_0$ is used when the oil temperature is higher than the predetermined value.

Therefore, it is assumed as the control by the standard conduction signal $C_0$ when the oil temperature is higher than the predetermined value (oil temperature corresponding to the intersecting point of the graph of FIG. 4), and it is assumed as the control by the oil temperature conduction signal C when the oil temperature is lower than or equal to the predetermined value. The property of the motor (1) thus consists of the property S1 in the low torque region and the property Q2 in the high torque region, and both output points of the required output point P1 of when the oil temperature is high and the required output point P2 of when the oil temperature is low are satisfied.

Figure 5:
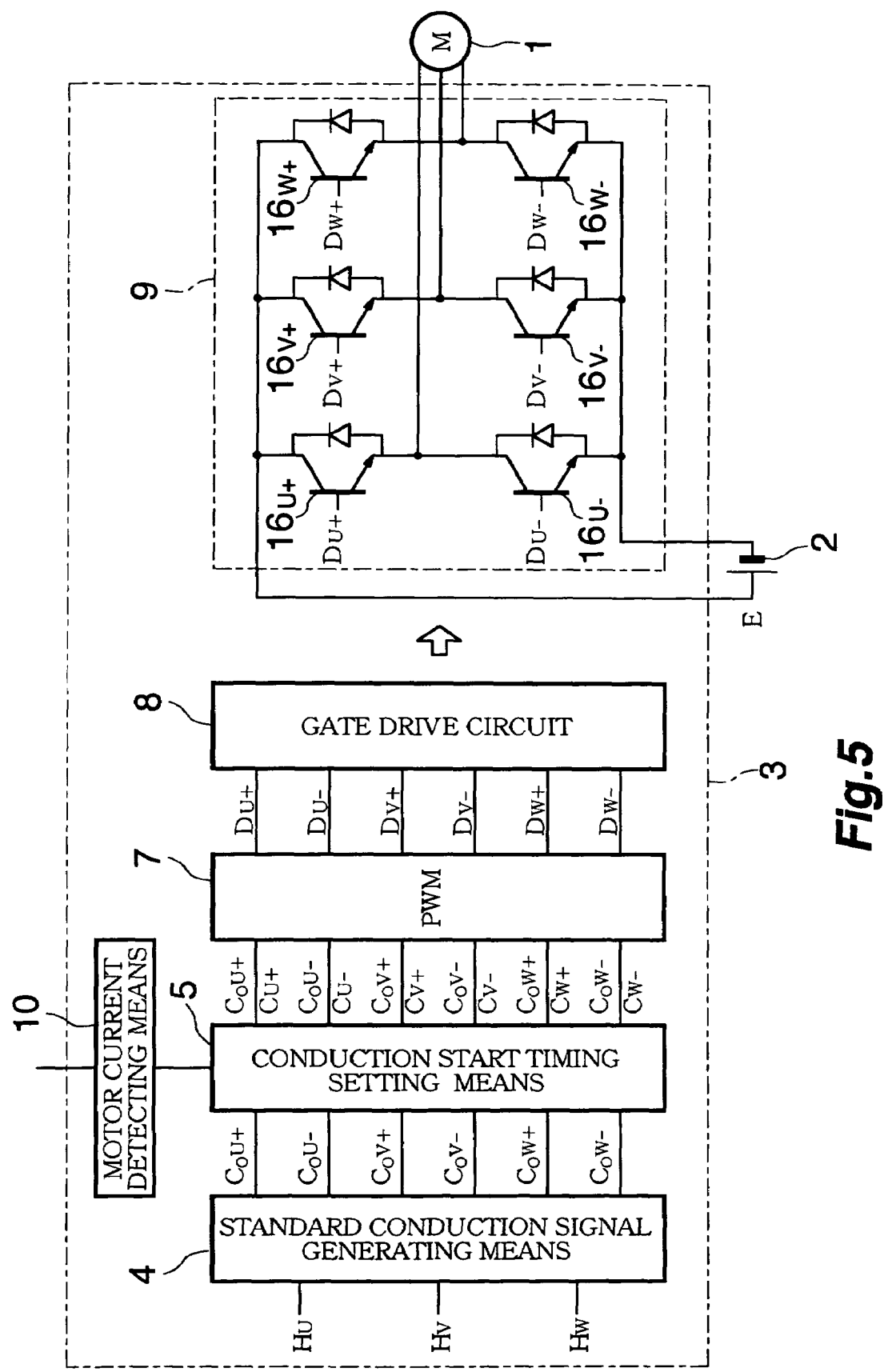
FIG. 5 is a block diagram of a controlling device of a hydraulic brushless motor showing an embodiment of the present invention.

The conduction start timing is changed by the oil temperature in the above embodiment, but the conduction start timing may be changed by the torque value or the rotation speed of the motor (1) in the vicinity of the intersection of the two straight lines, as apparent from the graph of FIG. 4. Furthermore, since correlation is established between the torque of the motor (1) and the current of the motor (1), switch may be performed when the current of the motor (1) corresponding to the torque value of the intersection of the two straight lines reaches the predetermined value. FIG. 5 shows such embodiment. In the following description, same reference characters are denoted for the same configuration as the first embodiment, and the explanation thereof is omitted.

As shown in FIG. 5, the conduction controlling device (3) of the controlling device is configured by the standard conduction signal generating means (4), the conduction start timing setting means (5), a motor current detecting means (10), the PWM means (7), the gate drive circuit (8), and the switching circuit (9).

The motor current detecting means (10) detects the current of the motor by means of an ammeter, and outputs the data of the current to the conduction start timing setting means (5).

The conduction start timing setting means (5) advances the conduction start timing when the current of the motor (1) is greater than or equal to a predetermined value, whereby control is made by the standard conduction signal $C_0$ when the current is less than the predetermined value (equivalent to when the oil temperature is higher than the predetermined value), and control is made by the low oil temperature conduction signal C when the current is greater than or equal to the predetermined value (equivalent to when the oil temperature is lower than or equal to the predetermined value). The property of the motor thus consists of the property S1 in the low torque region and the property Q2 in the high torque region, and both output points of the required output point P1 of when the oil temperature is high and the required output point P2 of when the oil temperature is low are satisfied.

The present invention is also applicable to the brushless motor other than the brushless DC motor (1) mounted on the automobile.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A method for controlling a brushless motor for operating a hydraulic brushless motor by switching a conduction timing to a plurality of switching elements; the method comprising the steps of:
    detecting an oil temperature; and
    advancing the conduction start timing when the oil temperature is lower than or equal to a predetermined value.

2. The method for controlling the hydraulic brushless motor according to claim 1, wherein the conduction start timing is advanced by 15 degrees to conduct continuously for 135 degrees.

3. A controlling device of a brushless motor for operating the hydraulic brushless motor by switching a conduction timing to a plurality of switching elements; the device comprising:
    an oil temperature detecting means for detecting the oil temperature; and
    a conduction start timing setting means for advancing the conduction start timing when the oil temperature of the motor is lower than or equal to a predetermined value.

* * * * *